US012686239B2

(12) United States Patent
Wagner et al.

(10) Patent No.: US 12,686,239 B2
(45) Date of Patent: Jul. 21, 2026

(54) METHOD FOR DETECTING A WEAR-RELEVANT LOAD ON A VEHICLE WHEEL

(71) Applicant: Huf Baolong Electronics Bretten GmbH, Bretten (DE)

(72) Inventors: Markus Wagner, Flehingen (DE);
Patrick Voegeli, Weingarten (DE)

(73) Assignee: Huf Baolong Electronics Bretten GmbH, Bretten (DE)

( * ) Notice: Subject to any disclaimer, the term of this patent is extended or adjusted under 35 U.S.C. 154(b) by 236 days.

(21) Appl. No.: 17/819,939

(22) Filed: Aug. 15, 2022

(65) Prior Publication Data

US 2023/0068156 A1 Mar. 2, 2023

(30) Foreign Application Priority Data

Sep. 1, 2021 (DE) ..................... 10 2021 122 660.0

(51) Int. Cl.
*B60C 23/04* (2006.01)
*B60C 23/06* (2006.01)

(52) U.S. Cl.
CPC ........ *B60C 23/061* (2013.01); *B60C 23/0488* (2013.01)

(58) Field of Classification Search
CPC . B60C 23/0488; B60C 11/246; B60C 23/061; B60C 23/0416; G01P 15/00
See application file for complete search history.

(56) References Cited

U.S. PATENT DOCUMENTS 5,731,754 A * 3/1998 Lee, Jr. ............... B60C 23/0433
340/447
6,240,353 B1 * 5/2001 Ishikawa .................. B60G 9/02
60/426

(Continued)

FOREIGN PATENT DOCUMENTS

DE 102005036593 A1 * 2/2007 ......... B60C 23/0401
DE 10 2009 058 882 A1 2/2012

(Continued)

OTHER PUBLICATIONS

Wikipedia article on Centrifugal Force, https://en.wikipedia.org/wiki/Centrifugal_force, website visited on Jun. 28, 2024 (Year: 2024).*

(Continued)

*Primary Examiner* — Anne Marie Antonucci
*Assistant Examiner* — Jared C Bean
(74) *Attorney, Agent, or Firm* — Orbit IP, LLP; Marc G. Martino

(57) ABSTRACT

A method for detecting a wear-relevant load on a vehicle wheel uses a tire pressure monitoring unit mounted on the vehicle wheel containing an acceleration sensor. A rotational frequency of the vehicle wheel is determined for a time interval from a series of measured values of the acceleration sensor at first time intervals. A centrifugal acceleration value is determined for the time interval. A proportionality factor is determined from the rotational frequency and centrifugal acceleration value, linking the square of the rotational frequency with the centrifugal acceleration. A rotational frequency of the wheel is continuously calculated from measured values of the centrifugal acceleration, which have been determined at second time intervals that are greater than the first time intervals, and from the proportionality factor. A load value is respectively calculated from the rotational (Continued)

frequency and the second time intervals. These load values are continuously added up to an overall load.

17 Claims, 1 Drawing Sheet

(56)                References Cited

U.S. PATENT DOCUMENTS

| | | | | |
|---|---|---|---|---|
| 2006/0123898 | A9 * | 6/2006 | Zhu | G01M 17/022 |
| | | | | 73/146 |
| 2007/0095446 | A1 | 5/2007 | Mancosu et al. | |
| 2007/0222569 | A1 | 9/2007 | Beranger et al. | |
| 2010/0083747 | A1 * | 4/2010 | Fink | B60C 23/061 |
| | | | | 73/146.5 |
| 2011/0082663 | A1 * | 4/2011 | Geisler | G01P 13/04 |
| | | | | 702/145 |
| 2011/0166825 | A1 | 7/2011 | Kammann | |
| 2011/0291826 | A1 * | 12/2011 | Ferber | B60C 23/0488 |
| | | | | 340/442 |
| 2014/0107946 | A1 * | 4/2014 | Kandler | B60C 23/04 |
| | | | | 702/34 |
| 2016/0323659 | A1 | 11/2016 | Singh et al. | |
| 2017/0129498 | A1 | 5/2017 | Singh et al. | |
| 2018/0272816 | A1 * | 9/2018 | Billy | B60C 23/0493 |
| 2018/0304703 | A1 | 10/2018 | Kimura | |
| 2019/0025113 | A1 * | 1/2019 | Masago | G01G 19/03 |
| 2019/0070910 | A1 | 3/2019 | Guinart et al. | |
| 2019/0160885 | A1 | 5/2019 | Zhang et al. | |
| 2019/0160894 | A1 | 5/2019 | Yu et al. | |
| 2019/0187026 | A1 | 6/2019 | Uhrich et al. | |
| 2020/0062268 | A1 * | 2/2020 | Steiner | B60C 23/0449 |
| 2020/0238770 | A1 * | 7/2020 | Karlsson | B60C 23/061 |
| 2020/0338938 | A1 | 10/2020 | Létard | |
| 2021/0049445 | A1 | 2/2021 | Bielby et al. | |
| 2021/0061021 | A1 | 3/2021 | Singh et al. | |
| 2021/0206211 | A1 | 7/2021 | Ribreau et al. | |
| 2021/0229504 | A1 | 7/2021 | Okazaki et al. | |
| 2021/0260937 | A1 | 8/2021 | Cyllik et al. | |

FOREIGN PATENT DOCUMENTS

| | | | |
|---|---|---|---|
| DE | 101 29 737 | B4 | 4/2015 |
| DE | 10 2010 004 149 | B4 | 1/2018 |
| DE | 10 2009 055 645 | B4 | 5/2019 |
| DE | 10 2018 132 548 | A1 | 6/2019 |
| DE | 11 2016 007 105 | T9 | 6/2019 |
| DE | 10 2015 223 968 | B4 | 1/2020 |
| DE | 10 2019 215 109 | A1 | 4/2021 |
| EP | 1 813 448 | B1 | 1/2013 |
| EP | 3 088 219 | A1 | 11/2016 |
| EP | 3 168 064 | B1 | 9/2018 |
| EP | B 376 205 | B1 | 12/2020 |
| EP | 3 779 393 | A1 | 2/2021 |
| EP | 3 789 215 | A1 | 3/2021 |
| EP | B 785 942 | A1 | 3/2021 |
| JP | 2012179928 | A * | 9/2012 |
| WO | 2004/056591 | A1 | 7/2004 |
| WO | 2017/061320 | A1 | 4/2017 |
| WO | 2017/063740 | A1 | 4/2017 |
| WO | 2019/229343 | A1 | 12/2019 |
| WO | 2020/038675 | A1 | 2/2020 |
| WO | 2021/029618 | A1 | 2/2021 |

OTHER PUBLICATIONS

Machine translation of the description of JP-2012179928-A, published Sep. 20, 2012, pp. 1-9 (Year: 2012).*
Machine translation of the description of DE-102005036593-A1, published Feb. 8, 2007, pp. 1-7 (Year: 2007).*

* cited by examiner

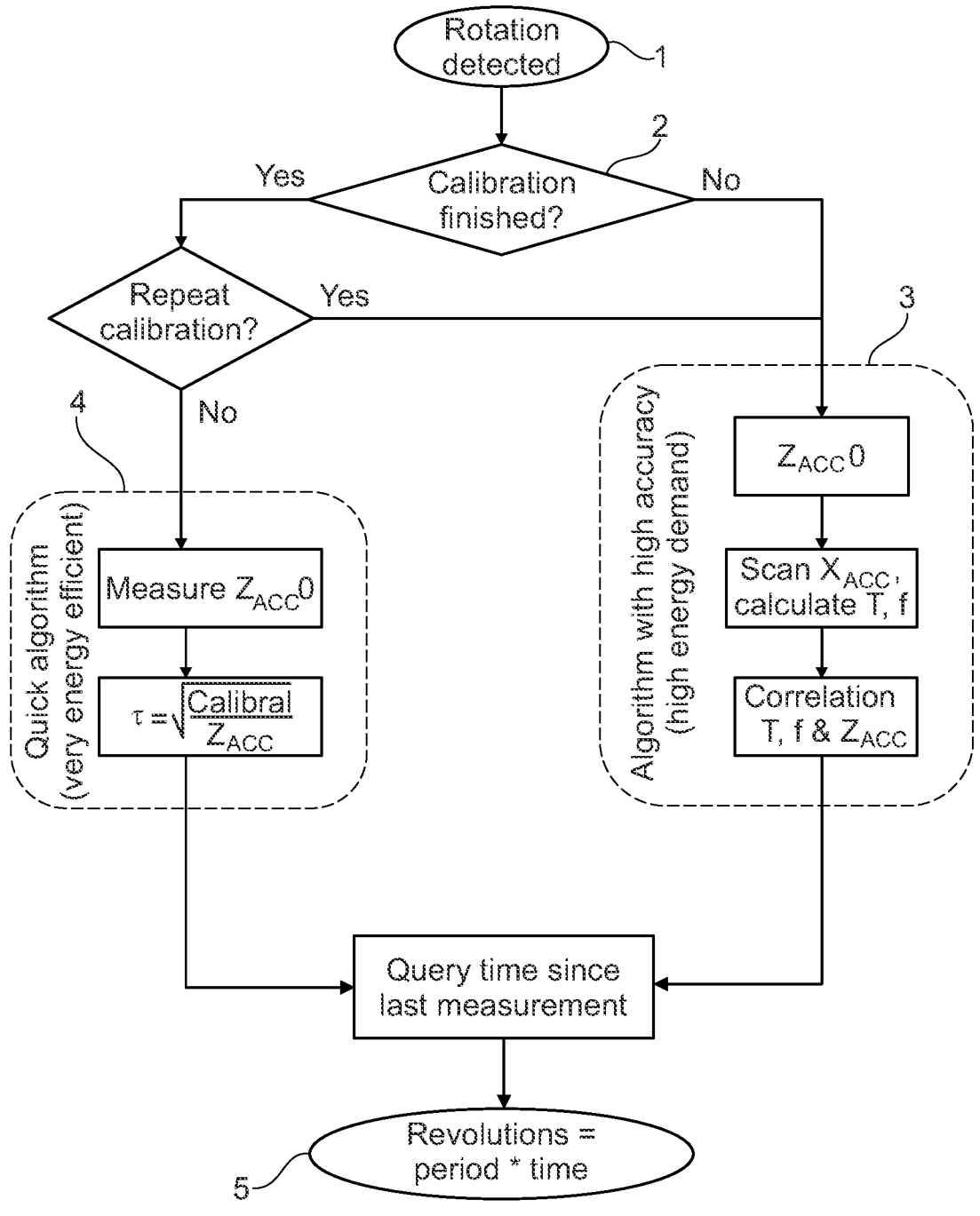

METHOD FOR DETECTING A WEAR-RELEVANT LOAD ON A VEHICLE WHEEL

CROSS-REFERENCE TO RELATED APPLICATIONS

This application claims priority to German Patent Application No. 10 2021 122 660.0, filed Sep. 1, 2021, the entire contents of which are hereby incorporated in full by this reference.

DESCRIPTION

Field of the Invention

The invention relates to a method for detecting a wear-relevant load on a vehicle wheel by means of a tire pressure monitoring device mounted on the vehicle wheel.

Background of the Invention

The wear of a vehicle wheel depends primarily on the number of wheel revolutions. Secondly, other factors such as tire pressure and road conditions also play a role. As modern tire pressure monitoring devices contain one or more acceleration sensors, they can detect the rotational frequency and thus the number of wheel revolutions. The signal of an acceleration sensor of a tire pressure monitoring device mounted on a wheel has a sinusoidal component due to the gravitational acceleration, from which the rotational frequency can be determined.

In order for the sinusoidal component of the signal of the acceleration sensor to be detected with a level of accuracy sufficient for determining the rotational frequency, the signal of the acceleration sensor must be measured sufficiently frequently, typically around 10 times per wheel revolution. Depending on the tire diameter, a wheel turns about 10 to 20 times per second at typical vehicle speeds. In order to reliably record the sinusoidal signal component of the acceleration sensor for determining the frequency, over 100 measured values must therefore be recorded and evaluated per second. This causes considerable energy consumption, which is particularly problematic for battery-operated tire pressure monitoring units.

SUMMARY OF THE INVENTION

An object of the present invention is to provide a way to detect the number of wheel revolutions or a wear-relevant load by means of a tire pressure monitoring unit whilst consuming less energy.

This object is achieved by a method having the features specified in claim 1. Advantageous further developments of the invention are the subject of the dependent claims.

The present invention saves the effort of continuously determining the rotational frequency of the vehicle wheel from a sinusoidal wave or a sinusoidal component of a signal from an acceleration sensor, i.e., of measuring the centrifugal acceleration at short time intervals of about 5 ms to 10 ms during the entire journey and evaluating the signal curve. In principle, it suffices according to the invention if the rotational frequency is determined just once from a sinusoidal signal curve or a sinusoidal component of a signal from an acceleration sensor of the tire pressure monitoring unit. The rotational frequency $\omega$ is linked with the centrifugal force F by the equation $F=mr\omega^2$ (r: distance of the acceleration sensor from the axis of rotation; m: sensor mass), such that a proportionality factor can be determined from the rotational frequency $\omega$ and the centrifugal acceleration $z_{acc}=r\omega^2=4\pi^2r/T^2$ (T: period duration, i.e., time for one wheel revolution), linking the square of the rotational frequency with the centrifugal acceleration. If this proportionality factor, which ideally indicates the distance of the tire pressure monitoring unit from the axis of rotation, is known, the current rotational frequency can be calculated directly from values of the current centrifugal acceleration.

Although the centrifugal acceleration contains a sinusoidal component in itself, which is based on the gravitational acceleration, as the gravitational acceleration adds to or counteracts the centrifugal force depending on the angle of rotation of the wheel, this dependency can be neglected for the purpose of detecting the total number of wheel revolutions. On the one hand, because this component is relatively small as the centrifugal acceleration is up to 500 times the gravitational acceleration g during fast travel, and on the other hand because the influence of the gravitational acceleration is statistically averaged out as the gravitational acceleration increases the measured centrifugal acceleration just as often as it reduces it.

Once the proportionality factor has been determined, it suffices in a method according to the invention to measure the centrifugal acceleration at time intervals that are large enough that the centrifugal acceleration does not substantially change in them, for example at time intervals of a few seconds. As soon as the proportionality factor has been determined, measurements at time intervals of, for example, 5 seconds to 15 seconds are therefore sufficient. Compared to measurements at time intervals of around 5 milliseconds to 10 milliseconds, as are necessary in order to determine the rotational frequency of a wheel by evaluating a sinusoidal signal curve, this is a substantial advantage, which enables a significant energy saving.

The accuracy with which a method according to the invention can determine a wear-relevant load of a vehicle tire depends on the accuracy with which the proportionality factor has been determined, which links the square of the rotational frequency with the centrifugal acceleration. In order to increase this accuracy, the proportionality factor can be statistically calculated from several series of measured values of the acceleration sensor for different time intervals and centrifugal acceleration values determined in each case for these time intervals.

By way of example, a measured value can be recorded by an acceleration sensor at first time intervals of, for example, 5 ms to 10 ms and then a value can be determined for the rotational frequency from 8 to 12 such values. The first time intervals in question then together form a time interval for which the rotational frequency determined in this way applies. In this time interval, the centrifugal acceleration must also be measured at least once such that a proportionality factor can then be determined from the determined rotational frequency and centrifugal acceleration. By determining the proportionality factor for different time intervals, such as 8 to 16 time intervals, a more accurate value for the proportionality factor can be determined by averaging the individual values determined for the proportionality factor.

According to the invention, in the simplest case, the number of wheel revolutions can be used as the total load value for a vehicle tire, which can be determined from the respective determined rotational frequency and the time that has passed meanwhile. A somewhat more accurate overall load value can be determined by also taking tire pressure into account, for example by giving wheel revolutions an increased weight when tire pressure is too high or too low.

As already mentioned, the proportionality factor, which links the square of the rotational frequency with the centrifugal acceleration, is a constant for a given vehicle wheel such that the proportionality factor itself only has to be determined once. Nevertheless, the proportionality factor can also be re-determined at the start of each journey or at predetermined time intervals.

The overall load value can be stored in a tire pressure monitoring unit itself or in a central unit of the vehicle, to which the tire pressure monitoring unit sends determined data. An advantageous refinement of the invention envisages that the overall load value is set to zero if the tire pressure falls below a predetermined threshold. When a tire is changed, this can prevent a new tire being assigned an overall load value that was determined for an old tire. The overall load value can, before it is set to zero, be stored as a load value. If a tire has been re-inflated after its pressure fell below the predetermined threshold, by taking into account the previously stored load value, the overall load can be calculated by adding up the current overall load value and a stored load value or several stored load values, if the tire has been inflated several times without replacement.

In tire pressure monitoring systems that determine the respective rotational frequency at the beginning of a journey from signals from an acceleration sensor of each tire pressure monitoring unit in order to distinguish tire pressure monitoring units on right wheels from tire pressure monitoring units on left wheels by their arithmetic sign (+ or −) and to distinguish steered front wheels from rear wheels by the absolute value of the rotational frequency, the method according to the invention can be carried out in a practical manner without additional energy consumption. In particular, in such tire pressure monitoring systems, the proportionality factor can be re-determined without substantial effort at the beginning of every journey.

Further details and advantages of the invention are explained below by means of an illustrative embodiment of the invention with reference to the attached drawing.

BRIEF DESCRIPTION OF THE DRAWINGS

FIG. 1 shows a flowchart of a method for detecting a wear-relevant load on a vehicle wheel.

DETAILED DESCRIPTION OF THE PREFERRED EMBODIMENTS

Step 1 of the method checks whether the vehicle is travelling. This can be done with an acceleration sensor of a tire pressure monitoring device mounted on a wheel of the vehicle. If the vehicle is travelling, i.e., a wheel revolution is detected, step 2 checks whether there is a valid value of a proportionality factor, which links the square of the rotational frequency with the centrifugal acceleration. Such a value can, for example, be stored in a memory of a tire pressure monitoring unit or central unit of the vehicle, with which the tire pressure monitoring unit communicates, wherein a flag can indicate whether the stored value is valid.

If there is no valid value of the proportionality factor, the proportionality factor is determined in step 3. For this purpose, an acceleration value is determined with an acceleration sensor of the tire pressure monitoring device at first time intervals of, for example, 5 ms to 10 ms, for example a value of the tangential acceleration $X_{acc}$ or the centrifugal acceleration $X_{acc}$. In this way, a series of measured values from an acceleration sensor is determined for a time interval formed from several first time intervals, for example 8 to 50 measured values. These measured values show a sinusoidal curve or their curve has a sinusoidal component. The frequency f of the sinusoidal curve or sinusoidal component of the signal curve can thus be measured by evaluating the series of measured values. For example, by smoothing the signal curve with low-pass filtering and determining the number of zero crossings.

The frequency determined in this way in step 3 is the rotational frequency of the wheel in the respective time interval. In step 3, at least one value of the centrifugal acceleration is measured during the time interval. The centrifugal acceleration is preferably measured several times in the time interval and an average formed from the measured values, which is then used as a centrifugal acceleration value for the time interval. If the rotational frequency is determined from a series of values of the centrifugal acceleration, these values can also be used to determine a centrifugal acceleration value for the time interval by averaging. If the rotational frequency is determined from a series of values of the tangential acceleration, values of the centrifugal acceleration can also be measured at first time intervals, and a centrifugal acceleration value can be determined therefrom for the time interval.

A proportionality factor is then determined from the value for the rotational frequency determined for the time interval and from the centrifugal acceleration value, which proportionality factor links the square of the rotational frequency with the centrifugal acceleration, for example by dividing the value for the rotational frequency by the centrifugal acceleration value. At the end of step 3, the determined proportionality factor is stored as a valid value of the proportionality factor, for example in a memory of the tire pressure monitoring unit or a central unit of the vehicle.

If it has already been established in step 2 that there is a valid value of the proportionality factor or after step 3 has been carried out, the method is continued with step 4.

In step 4, the centrifugal acceleration is measured at second time intervals $\Delta t_2$, which are larger than the first time intervals $\Delta t_1$, and then a value for the rotational frequency $\omega$ is calculated therefrom using the stored proportionality factor, for example by multiplying a measured value of the centrifugal acceleration by the proportionality factor. A load value of the tire is then calculated from the rotational frequency in step 5. In the simplest case, as a product of frequency f and second time interval $\Delta t_2$. However, tire pressure can also be included in the load value, as tire revolutions lead to increased wear if the tire pressure is too high or too low. At the end of step 4, the calculated load value is added to an overall load value stored in the tire pressure monitoring unit or a central unit of the vehicle.

Provided that a tire revolution is detected, step 4 is carried out again and again such that the overall load value continuously increases and makes it possible to evaluate the wear condition of the tire. When using the tire pressure monitoring device for the first time, the overall load value is zero and will then increase with time.

The second time intervals $\Delta t_2$ can be substantially larger than the first time intervals $\Delta t_1$, for example 100 to 1,000 times larger. In order to keep the energy consumption associated with the method low, it is advantageous if the second time intervals $\Delta t_2$ are at least 2 seconds, preferably at least 5 seconds, for example 5 seconds to 15 seconds.

One variant of the method described above envisages that the overall load value is set to zero if a fall in the tire pressure below a predetermined threshold is detected. This can prevent a new tire being assigned the overall load value determined for a previously used tire following a tire change. However, it is also possible that the overall load value is reset manually by a control signal every time a tire is changed.

In order to increase the reliability of the method, it is possible to determine the proportionality factor according to step 3 several times and then use an average of the determined proportionality factors in step 4.

What is claimed is:

1. A method for detecting a wear-relevant load on a vehicle wheel of a vehicle by means of a tire pressure monitoring unit optimized for low energy consumption that is mounted on the vehicle wheel and comprises at least one acceleration sensor, the method comprising the steps of:

providing the tire pressure monitoring unit with the at least one acceleration sensor;

providing a central unit of the vehicle in data communication with the tire pressure monitoring unit;

mounting the tire pressure monitoring unit on the vehicle wheel;

rotating the vehicle wheel;

measuring, via the tire pressure monitoring unit, a first set of centrifugal acceleration values at first time intervals by the at least one acceleration sensor;

determining, via the tire pressure monitoring unit and/or the central unit, a first rotational frequency of the vehicle wheel for an overall first time interval from a series of measured values of the at least one acceleration sensor at the first time intervals;

determining, via the tire pressure monitoring unit and/or the central unit, a centrifugal acceleration value for the overall first time interval;

determining, via the tire pressure monitoring unit and/or the central unit, a proportionality factor from the first rotational frequency and the centrifugal acceleration value, linking the square of the rotational frequency with the centrifugal acceleration;

measuring, via the tire pressure monitoring unit, a second set of centrifugal acceleration values at second time intervals by the at least one acceleration sensor;

successively calculating, via the tire pressure monitoring unit and/or the central unit, a second rotational frequency of the vehicle wheel from measured values of the centrifugal acceleration, which have been determined at the second time intervals that are greater than the first time intervals, and from the proportionality factor;

calculating, via the tire pressure monitoring unit and/or the central unit, a load value from the rotational frequency and the corresponding second time interval; and via the tire pressure monitoring unit and/or the central unit, successively adding these load values up to an overall load;

wherein energy consumption of the at least one acceleration sensor over time is greater during a defined time period when the at least one acceleration sensor measures in the first time intervals than during the defined time period when the at least one acceleration sensor measures in the second time intervals.

2. The method according to claim 1, wherein the second time intervals are at least 100 times as large as the first time intervals.

3. The method according to claim 1, wherein the rotational frequency is determined for the time interval from 4 to 100 measured values of the acceleration sensor.

4. The method according to claim 1, wherein the first time intervals are less than 30 milliseconds.

5. The method according to claim 1, wherein the second time intervals are at least 2 seconds.

6. The method according to claim 1, wherein the rotational frequency is determined for the time interval from measured values of tangential acceleration.

7. The method according to claim 1, wherein the proportionality factor is statistically calculated from several series of measured values of the acceleration sensor for different time intervals and centrifugal acceleration values determined in each case for these time intervals.

8. The method according to claim 1, wherein the load value corresponds to the number of wheel revolutions made in the second time interval.

9. The method according to claim 1, wherein the load value is calculated from the number of wheel revolutions made in the second time interval and from the tire pressure.

10. The method according to claim 1, wherein the overall load is set to zero if the tire pressure falls below a predetermined threshold.

11. The method according to claim 10, wherein the overall load, before it is set to zero, is stored as the load value.

12. The method according to claim 1, wherein the first time intervals are less than 30 milliseconds and wherein the second time intervals are at least 2 seconds.

13. A tire pressure monitoring device optimized for low energy consumption comprising a pressure sensor, at least one acceleration sensor and a control unit, wherein the control unit is designed to carry out in operation a method comprising the following steps:

determining a first rotational frequency of the vehicle wheel for an overall first time interval from a series of measured values of the at least one acceleration sensor at first time intervals;

determining a centrifugal acceleration value for the overall first time interval;

determining a proportionality factor from the rotational frequency and centrifugal acceleration value, linking the square of the rotational frequency with the centrifugal acceleration measuring a second set of centrifugal acceleration values by the at least one acceleration sensor;

successively calculating a second rotational frequency of the vehicle wheel from measured values of the centrifugal acceleration, which have been determined at second time intervals that are greater than the first time intervals, and from the proportionality factor;

calculating a load value from the rotational frequency and the corresponding second time interval; and successively adding these load values up to an overall load;

wherein a first energy consumption of the at least one acceleration sensor of the tire pressure monitoring device during the first time intervals is greater than a second energy consumption of the at least one acceleration sensor of the tire pressure monitoring device during the second time intervals when the first and second time intervals are compared over a same elapsed time period.

14. The tire pressure monitoring device according to claim 13, wherein the first time intervals are less than 30 milliseconds and wherein the second time intervals are at least 2 seconds.

15. A tire pressure monitoring system comprising:

a tire pressure monitoring device and a central vehicle unit in data communication with the tire pressure monitoring unit, said tire pressure monitoring device comprising a pressure sensor, at least one acceleration sensor and a control unit;

wherein the tire pressure monitoring system is designed to carry out a method comprising the following steps:

measuring, via the tire pressure monitoring unit, a first set of centrifugal acceleration values by the at least one acceleration sensor;

determining, via the tire pressure monitoring unit and/or the central unit, a first rotational frequency of the vehicle wheel for an overall first time interval from a series of measured values of the at least one acceleration sensor at first time intervals;

determining, via the tire pressure monitoring unit and/or the central unit, a centrifugal acceleration value for the overall first time interval;

determining, via the tire pressure monitoring unit and/or the central unit, a proportionality factor from the rotational frequency and centrifugal acceleration value, linking the square of the rotational frequency with the centrifugal acceleration;

measuring, via the tire pressure monitoring unit, a second set of centrifugal acceleration values by the at least one acceleration sensor;

successively calculating, via the tire pressure monitoring unit and/or the central unit, a second rotational frequency of the vehicle wheel from measured values of the centrifugal acceleration, which have been determined at second time intervals that are greater than the first time intervals, and from the proportionality factor;

calculating, via the tire pressure monitoring unit and/or the central unit, a load value from the rotational frequency and the corresponding second time interval; and via the tire pressure monitoring unit and/or the central unit, successively adding these load values up to an overall load.

16. The tire pressure monitoring system according to claim 15, wherein the first time intervals are less than 30 milliseconds and wherein the second time intervals are at least 2 seconds.

17. The tire pressure monitoring system according to claim 15, wherein the tire pressure monitoring system is optimized for low energy consumption.

* * * * *